United States Patent
Sutherland et al.

(10) Patent No.: US 9,600,247 B2
(45) Date of Patent: Mar. 21, 2017

(54) EXTENSIBLE DEFINITION OF INTERACTIVE SYSTEM PRODUCTIVITY FACILITY (ISPF) PANELS

(75) Inventors: Grant Sutherland, Cottesloe (AU); Peter D. Van Dyke, Woodlands (AU)

(73) Assignee: International Business Machines Corporation, Armonk, NY (US)

( * ) Notice: Subject to any disclaimer, the term of this patent is extended or adjusted under 35 U.S.C. 154(b) by 2578 days.

(21) Appl. No.: 12/345,131

(22) Filed: Dec. 29, 2008

(65) Prior Publication Data

US 2010/0169804 A1   Jul. 1, 2010

(51) Int. Cl.
*G06F 9/44*   (2006.01)

(52) U.S. Cl.
CPC ...................... *G06F 8/38* (2013.01)

(58) Field of Classification Search
CPC .......................................... G06F 8/38
See application file for complete search history.

(56) References Cited

U.S. PATENT DOCUMENTS

| | | | | | |
|---|---|---|---|---|---|
| 4,845,665 | A | * | 7/1989 | Heath | G06F 8/38 703/21 |
| 4,926,349 | A | * | 5/1990 | Thor | 715/744 |
| 5,179,700 | A | * | 1/1993 | Aihara et al. | 715/866 |
| 5,428,782 | A | * | 6/1995 | White | G06F 8/38 718/101 |
| 5,581,685 | A | * | 12/1996 | Sakurai | G06F 8/38 715/841 |
| 5,606,702 | A | * | 2/1997 | Diel et al. | 719/329 |
| 5,724,559 | A | * | 3/1998 | Masemore | 703/26 |
| 5,797,011 | A | * | 8/1998 | Kroll et al. | 717/137 |
| 5,872,970 | A | * | 2/1999 | Pickett et al. | 718/101 |
| 5,896,530 | A | * | 4/1999 | White | 718/102 |
| 6,115,710 | A | * | 9/2000 | White | |
| 6,115,711 | A | * | 9/2000 | White | |
| 7,069,547 | B2 | * | 6/2006 | Glaser | 717/154 |
| 2003/0084425 | A1 | * | 5/2003 | Glaser | 717/110 |
| 2005/0066016 | A1 | * | 3/2005 | Bailey et al. | 709/220 |

(Continued)

OTHER PUBLICATIONS

Michael Cairns , "Customizing Your ISPF Environment" , IBM Systems Magazine , Sep. 2007 , <http://www.ibmsystemsmag.com/mainframe/tipstechniques/systemsmanagement/customizing_your_ISPF_environment/?page=1 > pp. 1-4.*

(Continued)

*Primary Examiner* — Geoffrey St Leger
(74) *Attorney, Agent, or Firm* — Steven M. Greenberg, Esq.; CRGO Law

(57) ABSTRACT

Embodiments of the present invention provide a method, system and computer program product for extensible definition of interactive system productivity facility (ISPF) panels. In an embodiment of the invention, a method for extensibly defining ISPF panels can include loading a panel defined by different panel definition statements recognizable by an ISPF facility, and identifying a panel input exit facility amongst the panel definition statements defining the panel. Of note, the panel input exit facility references an external exit module. The method also can include determining an external exit module referenced by the panel input exit facility. Finally, the method includes passing records of the panel to the external input exit facility for pre-processing of the panel outside of the ISPF facility.

15 Claims, 2 Drawing Sheets

(56) References Cited

U.S. PATENT DOCUMENTS

| | | | |
|---|---|---|---|
| 2005/0149347 A1* | 7/2005 | Chew | G06Q 10/10 |
| | | | 715/762 |
| 2006/0036958 A1* | 2/2006 | Dreher | 715/764 |
| 2007/0150820 A1* | 6/2007 | Salvo | G06F 8/38 |
| | | | 715/760 |
| 2009/0216781 A1* | 8/2009 | Chauvet et al. | 707/100 |

OTHER PUBLICATIONS

ISPF and XEDIT Display System, IBM Technical Disclosure Bulletin, vol. 33, No. 6B, 1990, 2 pages, [retrieved on Nov. 3, 2016], Retrieved from the Internet: <URL:http://ip.com/>.*

Maurer, M. E., Full-screen testing of interactive applications, IBM Systems Journal, vol. 22, Issue: 3, 1983, pp. 246-261, [retrieved on Nov. 3, 2016], Retrieved from the Internet: <URL:http://ieeexplore.ieee.org/>.*

Hodil, E. D., et al., Knowledge-based systems in the commercial environment, IBM Systems Journal, vol. 25, Issue: 2, 1986, pp. 147-158, [retrieved on Nov. 3, 2016], Retrieved from the Internet: <URL:http://ieeexplore.ieee.org/>.*

* cited by examiner

EXTENSIBLE DEFINITION OF INTERACTIVE SYSTEM PRODUCTIVITY FACILITY (ISPF) PANELS

BACKGROUND OF THE INVENTION

Field of the Invention

The present invention relates to the field of programmatically defining a user interface in a computing environment and more particularly to defining ISPF panels for a terminal interface to a computing environment.

Description of the Related Art

The user interface provides the principal mode through which an end user interacts with a computing environment such as an operating system or application hosted by an operating system. The rudimentary user interface is a statically defined element established at design time of a computing application. Advanced forms of the user interface permit end user customization of the user interface at run time. Even more advanced forms of the user interface provide for a programming language accessible by the end user to define a user interface in a highly customizable way. Generally, the programming language provided for defining a user interface includes a discrete set of directives (commands) which when invoked in a particular arrangement result in a specific desired visualization of a user interface.

In the mini-computing and mainframe computing environments, the production and presentation of a user interface can be somewhat more limiting than that of the personal computing environment. In this regard, in the mini-computing and mainframe computing environments, many applications including the operating system itself are restricted to a textual user interface with limited if any access to graphical user interface (GUI) style elements. Thus, providing the ability of the end user to define a customizable form of a textual user interface can be critical to producing a marketable and human factors friendly interface to an underlying application.

In the mainframe environment, the Interactive System Productivity Facility (ISPF) technology enables the basic customization of a user interface for an application hosted by a mainframe operating system. ISPF includes a screen editor and primarily provides a "3270" terminal interface with a set of panels. A "panel" is a character-based full-screen "window" and each panel can include menus and dialogs to run tools on the underlying time sharing environment of the mainframe operating system. ISPF panels are made up of a number of sections. At the most basic level, these sections are either panel definition sections that define the format of the panel and the static content of the panel, or these sections are processing sections that define what actions are to be taken at times such as when a corresponding panel is initially displayed on the terminal or when the user enters data on the panel. Generally, these panels just provide a convenient interface to perform tasks such as executing modules of mainframe utility programs to do the actual work desired.

ISPF is frequently used to manipulate z/OS® (z/OS is a registered trademark of International Business Machines Corporation of Armonk, N.Y.) operating system data sets via the program development facility (PDF) of ISPF. Of note, ISPF is user-extensible and it is often used as an application program interface (API) by end users seeking to customize the user interface of a corresponding application executing in the mainframe environment. Underlying ISPF/PDF is an extensive set of tools that allow application developers to create panel-driven applications. As such, ISPF/PDF has been widely used by mainframe software vendors to create applications, resulting in many mainframe tools that are similar in appearance and function to ISPF.

The dialog manager (DM) component of ISPF provides application developers with services needed to develop interactive applications. These services include services to prompt an application user to enter data by displaying information on a terminal, read the data into a work area, verify and process the data, store data entered by the user, display information requested by the user, and provide interactive messages, help displays, and tutorials. ISPF provides a programming language for defining the content and format of panels using panel definition statements. As with most programming languages, the ISPF panel language is static and does not provide for extension by the addition of new statements. Consequently, application developers cannot use functionality in defining panels beyond what is provided by ISPF.

As an example, the panel language provided with ISPF does not provide any means for conditionally including or excluding panel definition statements dependent upon some testable condition. This limitation, solved in many programming languages by the use of one or more preprocessor statements, restricts the flexibility of panels, and often forces the programmer to create multiple versions of a panel to display different content or different format depending upon testable conditions. Two major drawbacks result. First, there are multiple versions of panel definitions that must be maintained. Second, the application program that displays the panel must contain program code to determine which version of the panel needs to be displayed.

An alternative approach capitalizes upon a panel facility provided with ISPF referred to a "dynamic formatting". In dynamic formatting, the format and content of the panel can be dynamically managed by the application program displaying the panel. Still, dynamic formatting can be complex and requires substantial program code to format the panel and process data entered by the user. Further, dynamic formatting does not permit the use of many other panel definition statements provide by ISPF. While ISPF also provides a facility for imbedding or invoking external code from within panels, such as embedded or invoked REXX compliant programs, the embedding or invocation of external code from within a panel can be restricted to use within the processing sections of the panel, and cannot be used to change the format or static content defined in panel definition sections of the panel.

BRIEF SUMMARY OF THE INVENTION

Embodiments of the present invention address deficiencies of the art in respect to ISPF panel definition and provide a novel and non-obvious method, system and computer program product for extensible definition of ISPF panels. In an embodiment of the invention, a method for extensibly defining ISPF panels can include loading a panel defined by different panel definition statements recognizable by an ISPF facility, and identifying a panel input exit facility amongst the panel definition statements defining the panel. Of note, the panel input exit facility references an external exit module. The method also can include determining an external exit module referenced by the panel input exit facility. Finally, the method includes passing records of the panel to the external input exit facility for pre-processing of the panel outside of the ISPF facility before the panel is processed by the ISPF facility.

In another embodiment of the invention, a computer data processing system can be configured for extensibly defining ISPF panels. The system can include an operating system executing in a host computer, an ISPF facility provided by the operating system and a number of panels each defined by different panel definition statements recognizable by the ISPF facility. Specifically, the panel definition statements can include at least one panel input exit facility referencing an external input exit facility. Importantly, the ISPF facility can include program code enabled to load a panel amongst the panels, to identify a panel input exit facility amongst the panel definition statements defining the loaded panel, to determine an external exit module referenced by the loaded panel input exit facility, and to pass records of the loaded panel to the external input exit facility for pre-processing of the panel outside of the ISPF facility.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for extensibly defining ISPF panels. In accordance with an embodiment of the present invention, a panel definition input statement configured to reference an external exit module can be defined for recognition by an ISPF facility as a panel input exit facility that can be invoked through an ISPF panel. When invoked in processing a panel by the ISPF facility, the external exit module referenced by the panel input exit facility can be provided different records of the ISPF panel. In this regard, each of the records can encapsulate all or a portion of a single ISPF panel definition statement.

As such, for one or more records provided to the external exit module through the panel exit input facility, the external exit module can delete an encapsulated panel definition statement by deleting the received record, modify an encapsulated panel definition statement by modifying the received record, ignore an encapsulated panel definition statement by returning the one of the records to the ISPF facility unchanged, or insert an additional panel definition statement by inserting a new record with the additional panel definition statement. Further, the external exit module can modify only sections of a panel definition statement encapsulated within multiple records by deleting or modifying the received record. Finally, the external exit module can process new panel definition statements not recognized by a conventional ISPF facility. In this way, the processing capability of the ISPF facility can be extended without limit by outsourcing panel processing to the external exit module.

Figure 1:
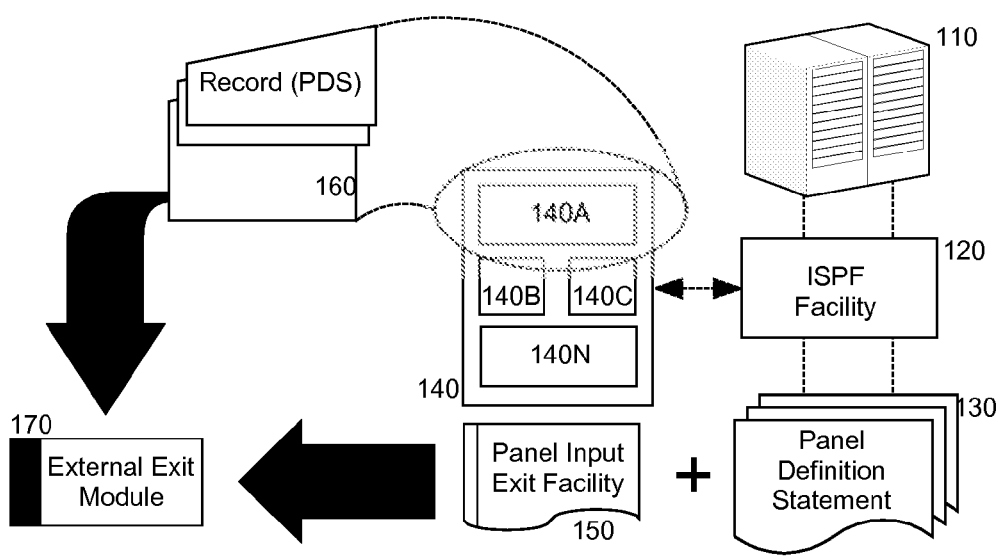
FIG. 1 is a pictorial illustration of a process for extensibly defining ISPF panels.

In illustration, FIG. 1 is a pictorial illustration of a process for extensibly defining ISPF panels. As shown in FIG. 1, a computing host 110 can include an ISPF facility 120 configured to process different panel definition statements 130 to define one or more panels 140A, 140B, 140C, 140N in a user interface of the computing host 110. A panel input exit facility 150 referencing one or more external exit modules 170 (only a single external exit module 170 shown for the purpose of illustrative simplicity) also can be included amongst the panel definition statements 130 for the different panels 140A, 140B, 140C, 140N. It is to be recognized, however, that multiple ones of the different panels 140A, 140B, 140C, 140N can reference the same or different external exit modules 170. In any event, upon invoking the panel input exit facility 150 for a particular one of the defined panels 140A, 140B, 140C, 140N, the referenced external exit module 170 can receive in a sequence each of the records 160 of the particular one of the panels 140A, 140B, 140C, 140N.

Each of the records can include at most one of the panel definition statements 130. Thereafter, for each received one of the records 160, program code of the external exit module 170 can delete the received one of the records 160 thereby deleting an encapsulated one of the panel definition statements 130, modify the received one of the records 160 thereby modifying an encapsulated one of the panel definition statements 130, ignore the received one of the records 160 by returning the received one of the records 160 to the ISPF facility 120 unchanged, or insert an additional record with a new one of the panel definition statements 130. Further, the program code of the external exit module 170 can modify only portions of a panel definition statement encapsulated within multiple ones of the records by deleting or modifying the received one of the records 160. Finally, the program code of the external exit module 170 can process new panel definition statements not already recognized by the ISPF facility 120.

Figure 2:
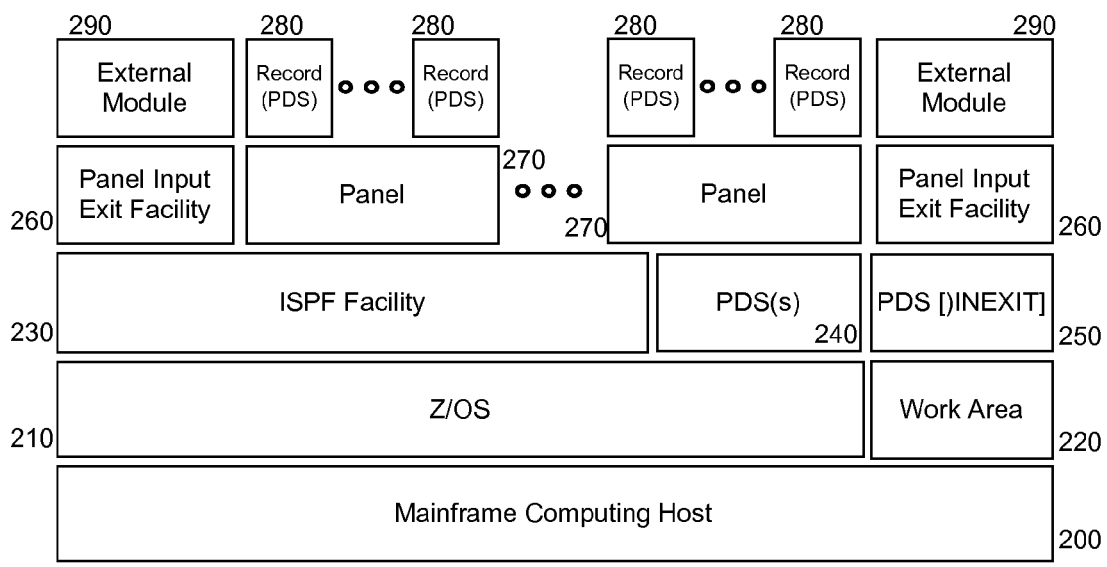
FIG. 2 is a schematic illustration of a computer data processing system configured for extensibly defining ISPF panels; and, FIG. 3 is a flow chart illustrating a process for extensibly defining ISPF panels.

In further illustration, FIG. 2 is a schematic illustration of a computer data processing system configured for extensibly defining ISPF panels. The system can include a computing host 200 such as mainframe or minicomputing host. The computing host 200 can support the execution of an operating system such as the z/OS operating system manufactured by International Business Machines Corporation of Armonk, N.Y., United States of America. The operating system 210, in turn, can provide an ISPF facility 230 configured to process a predefined set of panel definition statements 240. In this regard, a panel input exit panel definition statement 250 can be included amongst the panel definition statements 240 so as to provide a recognizable panel definition statement for processing by the ISPF facility 230.

The panel definition statements 240 can be arranged to define one or more different panels 270 displayed through the operating system 210 when the panel definition statements 240 are processed by the ISPF facility 230. One or more of the panels 270 can include a panel input exit facility 260 defined by the panel input exit panel definition statement 250. Each panel input exit facility 260 can reference a corresponding external module 290. Upon invocation of the panel input exit facility 260, the records 280 of the corresponding panel 270 can be provided serially to the external module 290 for processing.

Specifically, as each of the records 280 can encapsulate a panel definition statement 240 partially defining the corresponding panel 270, the pre-processing of the external module 290 can include deleting the encapsulated panel definition statement 240 by deleting the received one of the records 280, modifying the encapsulated panel definition statement 240 by modifying the received one of the records 280, ignoring the encapsulated panel definition statement 240 by returning the received one of the records 280 to the ISPF facility 230 unchanged, or inserting an additional panel definition statement in a new record. The pre-processing further can include modifying only sections of the encapsulated panel definition statement 240 when the encapsulated panel definition statement 240 spans multiple different ones of the records 280. Finally, the pre-processing can include processing a new panel definition statement not already recognized by the ISPF facility 230. In all circumstances, access to a work area 220 for the corresponding panel 270 can permit full interaction with the panel 270 by the program code of the external module 290.

Figure 3:
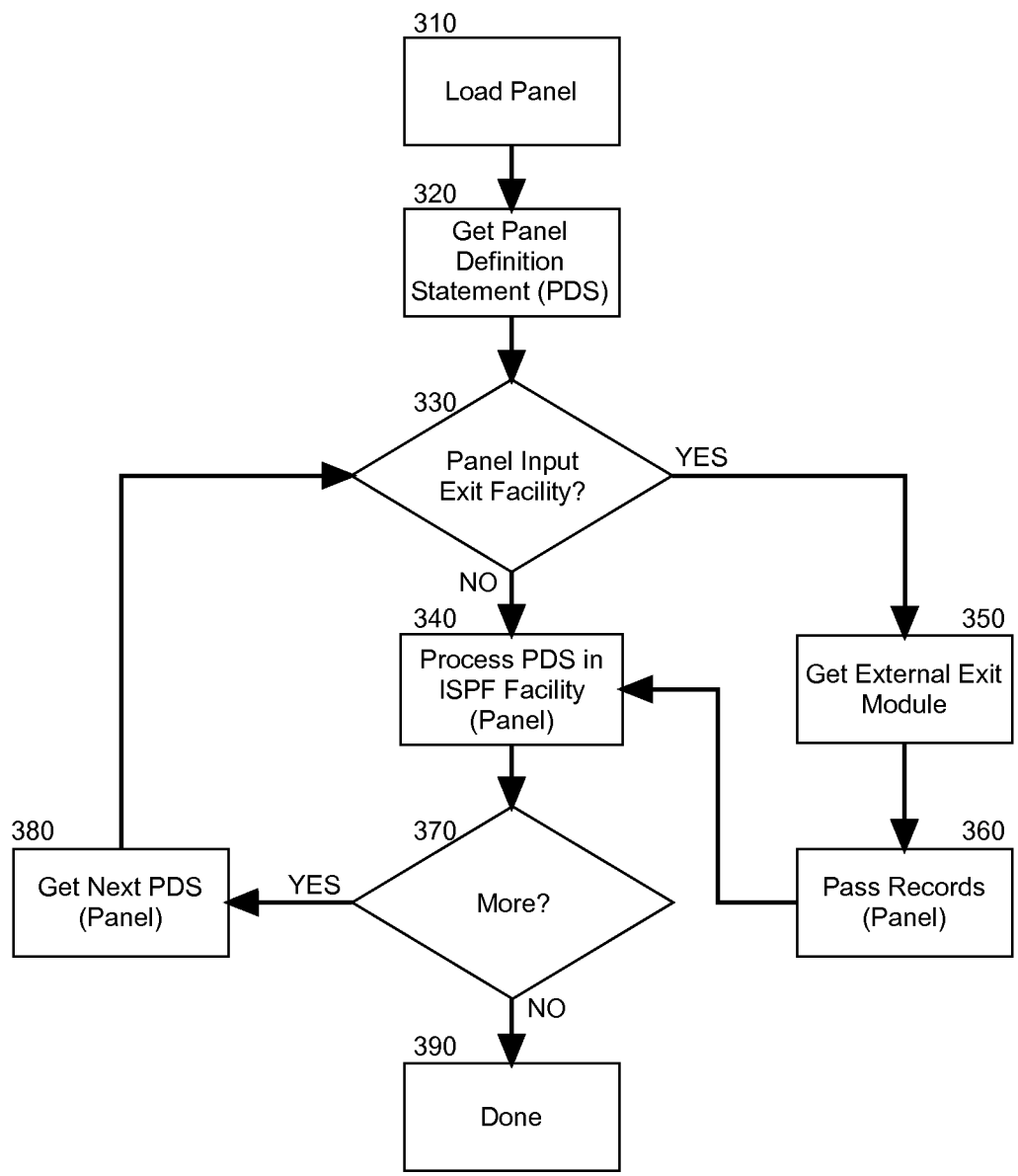

In yet further illustration, FIG. 3 is a flow chart illustrating a process for extensibly defining ISPF panels. Beginning in block 310, a panel can be loaded for processing. In block 320, a first panel definition statement defining a portion of the panel can be retrieved and in decision block 330, it can be determined whether or not the panel definition statement is a panel input exit facility referencing an external exit module. If not, in block 340 the panel definition statement can be processed conventionally by the ISPF facility.

However, if the panel definition statement is a panel input exit facility, in block 350 the external exit module referenced by the panel input exit facility can be invoked and in block 360, the records of the panel can be passed in series to the external exit module for pre-processing. In either case, in decision block 370, if additional panel definition statements remain to be processed for the panel, in block 380 a next panel definition statement can be retrieved and the process can repeat through decision block 330. When no further panel definition statements remain to be processed as determined in decision block 370, in block 390 the process can end.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for extensibly defining interactive system productivity facility (ISPF) panels, the method comprising:
   loading a panel defined by a plurality of panel definition statements recognizable by an ISPF;
   identifying a panel input exit facility amongst the panel definition statements defining the panel, the panel input exit facility referencing an external exit module;
   determining an external exit module referenced by the panel input exit facility; and,
   passing records of the panel to the external exit module for pre-processing of the panel outside of the ISPF.

2. The method of claim 1, wherein the pre-processing of the panel outside of the ISPF comprises deleting a panel definition statement encapsulated by one of the records.

3. The method of claim 1, wherein the pre-processing of the panel outside of the ISPF comprises modifying a panel definition statement encapsulated by one of the records.

4. The method of claim 1, wherein the pre-processing of the panel outside of the ISPF comprises ignoring a panel definition statement encapsulated by one of the records by returning the one of the records to the ISPF unchanged.

5. The method of claim 1, wherein the pre-processing of the panel outside of the ISPF comprises inserting an additional panel definition statement in one of the records.

6. The method of claim 1, wherein the pre-processing of the panel outside of the ISPF comprises modifying only a section of a panel definition statement encapsulated by one of the records.

7. The method of claim 1, wherein the pre-processing of the panel outside of the ISPF comprises processing a new panel definition statement not already recognized by the ISPF.

8. A computer data processing system configured for extensibly defining interactive system productivity facility (ISPF) panels, the system comprising:
   an operating system executing in a host computer;
   an ISPF provided by the operating system;
   a plurality of panels each defined by a plurality of panel definition statements recognizable by the ISPF, the panel definition statements comprising at least one panel input exit facility referencing an external exit module; and, the ISPF comprising program code enabled to load a panel amongst the panels, to identify a panel input exit facility amongst the panel definition statements defining the loaded panel, to determine an external exit module referenced by the loaded panel input exit facility, and to pass records of the loaded panel to the external exit module for pre-processing of the panel outside of the ISPF.

9. A computer program product comprising a non-transitory computer usable storage medium storing computer usable program code for extensibly defining interactive system productivity facility (ISPF) panels, the computer program product comprising:

computer usable program code for loading a panel defined by a plurality of panel definition statements recognizable by an ISPF;

computer usable program code for identifying a panel input exit facility amongst the panel definition statements defining the panel, the panel input exit facility referencing an external exit module;

computer usable program code for determining an external exit module referenced by the panel input exit facility; and, computer usable program code for passing records of the panel to the external exit module for pre-processing of the panel outside of the ISPF.

10. The computer program product of claim 9, wherein the computer usable program code for pre-processing of the panel outside of the ISPF comprises computer usable program code for deleting a panel definition statement encapsulated by one of the records.

11. The computer program product of claim 9, wherein the computer usable program code for pre-processing of the panel outside of the ISPF comprises computer usable program code for modifying a panel definition statement encapsulated by one of the records.

12. The computer program product of claim 9, wherein the computer usable program code for pre-processing of the panel outside of the ISPF comprises computer usable program code for ignoring a panel definition statement encapsulated by one of the records by returning the one of the records to the ISPF unchanged.

13. The computer program product of claim 9, wherein the computer usable program code for pre-processing of the panel outside of the ISPF comprises computer usable program code for inserting an additional panel definition statement in one of the records.

14. The computer program product of claim 9, wherein the computer usable program code for pre-processing of the panel outside of the ISPF comprises computer usable program code for modifying only a section of a panel definition statement encapsulated by one of the records.

15. The computer program product of claim 9, wherein the computer usable program code for pre-processing of the panel outside of the ISPF comprises computer usable program code for processing a new panel definition statement not already recognized by the ISPF.

* * * * *